(12) United States Patent
Yoshinaga

(10) Patent No.: US 7,227,318 B2
(45) Date of Patent: Jun. 5, 2007

(54) DEFLECTION DEVICE FOR PROJECTION TUBE AND PROJECTION TUBE APPARATUS

(75) Inventor: Takahiko Yoshinaga, Takatsuki (JP)

(73) Assignee: Matsushita Toshiba Picture Display Co., Ltd., Osaka (JP)

( * ) Notice: Subject to any disclaimer, the term of this patent is extended or adjusted under 35 U.S.C. 154(b) by 131 days.

(21) Appl. No.: 11/057,623

(22) Filed: Feb. 14, 2005

(65) Prior Publication Data

US 2005/0194917 A1    Sep. 8, 2005

(30) Foreign Application Priority Data

Mar. 5, 2004    (JP) ............................. 2004-062901

(51) Int. Cl.
*H01J 29/70* (2006.01)
(52) U.S. Cl. ...................... 315/369; 315/370
(58) Field of Classification Search ................ 315/369, 315/370
See application file for complete search history.

(56) References Cited

U.S. PATENT DOCUMENTS 3,735,193 A * 5/1973 Ikeuchi ....................... 315/370

FOREIGN PATENT DOCUMENTS

JP    2002-330446    11/2002

* cited by examiner

*Primary Examiner*—David Vu
(74) *Attorney, Agent, or Firm*—Hamre, Schumann, Mueller & Larson, P.C.

(57) ABSTRACT

A deflection device for a projection tube includes a main deflection device for generating a raster and an auxiliary deflection device for correcting a convergence. The auxiliary deflection device includes a toroidal auxiliary horizontal coil, a saddle-type auxiliary vertical coil, and a ferrite core. According to this configuration, the deflection efficiency is enhanced, and pincushion distortion in upper and lower portions can be corrected efficiently while a change in the shape of a beam spot is reduced.

7 Claims, 13 Drawing Sheets

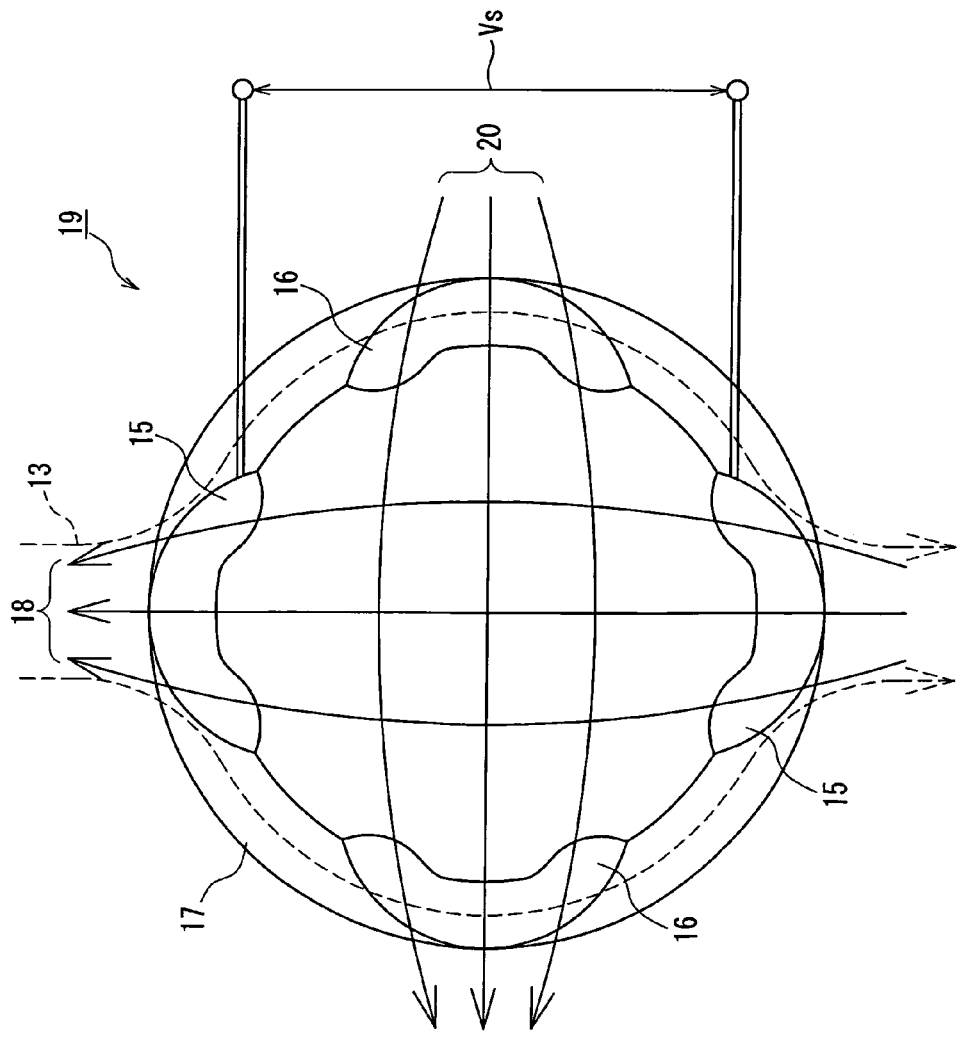
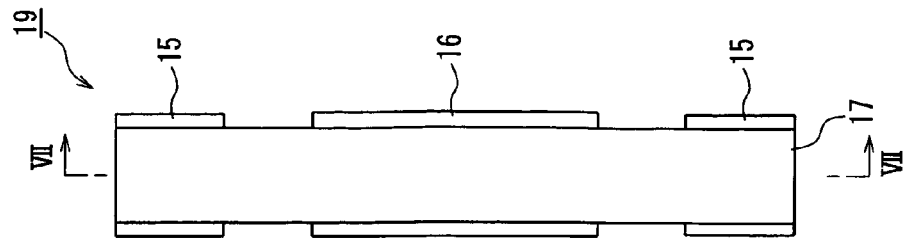
FIG. 6A PRIOR ART
FIG. 6B PRIOR ART

DEFLECTION DEVICE FOR PROJECTION TUBE AND PROJECTION TUBE APPARATUS

BACKGROUND OF THE INVENTION

1. Field of the Invention

The present invention relates to a deflection device for a projection tube, and a projection tube apparatus provided with the deflection device.

2. Description of the Related Art

Recently, in order to satisfy market demands for the enlargement of a screen and the reduction in price, a projection TV is being used widely. FIG. 1 is a schematic view showing a configuration of the projection TV. The projection TV includes projection tube apparatuses 1 to 3 corresponding to respective colors of red, green, and blue, and the projection tube apparatuses 1 to 3 respectively are provided with a deflection device 4. Rasters generated from the projection tube apparatuses 1 to 3 of the respective colors are projected onto a screen 5, whereby a color image is formed.

FIG. 2 is a side view of the deflection device 4 provided on each of the projection tube apparatuses 1 to 3 used for the projection TV. A main deflection device 6 generating a raster is composed of a main horizontal coil 43, a main vertical coil 7, and a main core 8. On a neck side of the main deflection device 6, there is provided an auxiliary deflection device 9 for correcting a raster shift (misconvergence) occurring on the screen 5 of the projection TV due to the error when the projection tube apparatuses (projection tube apparatuses 1 to 3 in FIG. 1) of the respective colors of red, green, and blue are incorporated into a projection TV set.

FIG. 3 is a front view of the auxiliary deflection device 9. Herein, an XYZ rectangular coordinate system is defined, in which a tube axis of the projection tube apparatus (projection tube apparatuses 1 to 3 in FIG. 1) having the main deflection device 6 is a Z-axis, a horizontal axis orthogonal to the Z-axis is an X-axis, and a vertical axis orthogonal to the X-axis and the Z-axis is a Y-axis. The auxiliary deflection device 9 is composed of an auxiliary core 10, an auxiliary horizontal coil 11, and an auxiliary vertical coil 12. The auxiliary horizontal coil 11 is wound in a toroidal shape in the vicinity of a position of the auxiliary core 10 where the X-axis crosses, and the auxiliary vertical coil 12 is wound in a toroidal shape in the vicinity of a position of the auxiliary core 10 where the Y-axis crosses. An appropriate current is supplied to the auxiliary deflection device 9 with such a configuration, whereby a convergence is corrected so as to obtain an appropriate color image without any color displacement on the screen (screen 5 in FIG. 1) of the projection TV.

In the case of a toroidal auxiliary deflection coil, as shown in FIG. 4A, for example, a deflection magnetic field 13 of the main horizontal coil 43 of the main deflection device 6 is interlinked with the auxiliary horizontal coil 11, whereby an induced voltage Vt in a pulse shape with the same period as a horizontal period is generated between terminals of the auxiliary horizontal coil 11, as shown in FIG. 4B. Thus, in order to correct a convergence appropriately, a high voltage for canceling the induced voltage Vt is required as a driving voltage for the auxiliary deflection device, which increases power consumption.

Furthermore, as shown in FIG. 5, the auxiliary horizontal coil 11 and the auxiliary vertical coil 12 are wound in a toroidal shape. Therefore, a magnetic field generated from a winding present outside with respect to the auxiliary core 10 becomes a leakage magnetic field 14 that does not contribute to the deflection, resulting in a low deflection efficiency.

JP 2002-330446 A discloses a deflection device that solves the above-mentioned problems. FIG. 6A is a front view of an auxiliary deflection device 19 of JP 2002-330446 A, and FIG. 6B is a side view thereof. The auxiliary deflection device 19 is composed of a saddle-type auxiliary horizontal coil 15, a saddle-type auxiliary vertical coil 16, and an auxiliary core 17. The auxiliary horizontal coil 15 and the auxiliary vertical coil 16 respectively generate an auxiliary horizontal magnetic field 18 and an auxiliary vertical magnetic field 20. The auxiliary horizontal coil 15 is of a saddle type. Therefore, for example, the number of magnetic fluxes of the deflection magnetic field 13 of the main horizontal coil 43 of the main deflection device 6, which are interlinked with the auxiliary horizontal coil 15, is small. Thus, an induced voltage Vs generated between terminals of the auxiliary horizontal coil 15 is smaller than the induced voltage Vt, so that the power consumption can be reduced.

FIG. 7 is a cross-sectional view taken along a line VII—VII in FIG. 6B. The auxiliary deflection device 19 is symmetrical with respect to an XZ-plane and a YZ-plane. Therefore, FIG. 7 shows only a first quadrant. Both of the auxiliary horizontal coil 15 and the auxiliary vertical coil 16 are of a saddle type, and their windings are wound inside of the auxiliary core 17, so that the deflection efficiency thereof is higher than that of the toroidal type.

In the above-mentioned deflection device of JP 2002-330446 A in which both of the auxiliary horizontal coil 15 and the auxiliary vertical coil 16 are of a saddle type, although the power consumption can be reduced by decreasing an induced voltage caused by a main deflection magnetic field generated by the main deflection coil, compared with the deflection device in which both of the auxiliary horizontal coil 11 and the auxiliary vertical coil 12 are of a toroidal type, there is a problem that the effect of the reduction in power consumption is not sufficient. Hereinafter, the reason for this will be described with reference to FIGS. 7 and 8.

FIG. 8 is a graph showing results obtained by measuring a Y-axis direction component By of the auxiliary horizontal magnetic field 18 generated by the auxiliary horizontal coil 15 along the X-axis. As shown in FIG. 8, the Y-axis direction component By becomes maximum when X=0, and decreases with distance from X=0 (i.e., Y-axis). A magnetic field 21 having such an intensity distribution generally is called a barrel type. As shown in FIG. 7, when a winding angle $\theta_H$ of the auxiliary horizontal coil 15 is larger than 30° and smaller than 90°, the auxiliary horizontal magnetic field becomes a barrel-type magnetic field. Herein, the winding angle $\theta_H$ is defined by an angle, in an XY-plane, formed by the X-axis and a straight line passing through the Z-axis and a midpoint of the auxiliary horizontal coil 15 in a circumferential direction with respect to the Z-axis, which is present in each quadrant partitioned by the XZ-plane and the YZ-plane. The winding angle $\theta_H$ at which the deflection efficiency of the auxiliary horizontal coil 15 becomes maximum is 0°. As the winding angle $\theta_H$ increases, the deflection efficiency decreases, and becomes minimum when $\theta_H=90°$.

The auxiliary horizontal coil 15 has been described above. The above description also applies to the auxiliary vertical coil 16. A winding angle $\theta_V$ of the auxiliary vertical coil 16 is defined by an angle, in the XY-plane, formed by the Y-axis and a straight line passing through the Z-axis and a midpoint of the auxiliary vertical coil 16 in a circumferential direction with respect to the Z-axis, which is present in each quadrant partitioned by the XZ-plane and the YZ-plane.

As is understood from FIG. 7, in the deflection device of JP 2002-330446 A, respective inner diameters $D_H$, $D_V$ of the auxiliary horizontal coil 15 and the auxiliary vertical coil 16 are the same, and in order to prevent the auxiliary horizontal coil 15 and the auxiliary vertical coil 16 from interfering with each other, the respective winding angles $\theta_H$, $\theta_V$ cannot help being set to be larger than 30°. Consequently, the magnetic fields generated by the auxiliary horizontal coil 15 and the auxiliary vertical coil 16 both become barrel-type magnetic fields. Thus, in the deflection device of JP 2002-330446 A, the deflection efficiency is low, and although the induced voltage Vs caused by the deflection magnetic field 13 of the main horizontal coil 43 can be reduced by making the auxiliary horizontal coil 15 and the auxiliary vertical coil 16 to be a saddle type, the power consumption cannot be reduced sufficiently as a whole.

Furthermore, as shown in FIG. 9, by making the inner diameter $D_H$ of the saddle-type auxiliary horizontal coil 15 to be different from the inner diameter $D_V$ of the saddle-type auxiliary vertical coil 16, the winding angles $\theta_H$, $\theta_V$ can be set appropriately to a certain degree. However, in this case, it is necessary to stack the auxiliary horizontal coil 15, the auxiliary vertical coil 16, and the auxiliary core 17 successively from the Z-axis toward the outside, which increases the inner diameters of the auxiliary vertical coil 16 and the auxiliary core 17, and enlarges the distance of the auxiliary vertical coil 16 and the auxiliary core 17 from an electron beam, resulting in a decrease in a deflection efficiency.

Furthermore, generally, in the case of a projection TV, the auxiliary deflection device has a function of correcting pincushion distortion in upper and lower portions of a screen, as well as the function of correcting a convergence. The power required for correcting pincushion distortion in upper and lower portions of a screen is remarkably larger than the power consumption during correction of a convergence. Thus, in order to efficiently reduce the power consumption with a projection TV set, it is important to enhance the deflection efficiency of the auxiliary vertical coil for deflection, particularly in vertical directions of the auxiliary deflection device.

Furthermore, in the deflection device of JP 2002-330446 A, both of the auxiliary horizontal magnetic field and the auxiliary vertical magnetic field are barrel-type magnetic fields, as described above. Therefore, the spot shape of an electron beam in a circumferential region of a screen changes when the auxiliary deflection device is operated. FIG. 10 shows beam spots in a first quadrant of a screen. First, an electron beam 22 on the X-axis will be described. The auxiliary horizontal magnetic field is of a barrel type, so that a Lorentz force Fa acting on an electron 22a of the electron beam 22 closer to the Y-axis is larger than a Lorentz force Fb acting on an electron 22b of the electron beam 22 farther from the Y-axis. Consequently, the electron beam 22 has a vertically oriented shape as represented by a broken line 23, which degrades image quality. An electron beam 22' on the Y-axis has a horizontally oriented shape as represented by a broken line 23' due to the barrel-type auxiliary vertical magnetic field for the same reason as the above. Therefore, the cross-sectional shape of an electron beam is varied depending upon the degree of an operation of the auxiliary deflection device, and there is a great variation among mass-produced deflection devices.

SUMMARY OF THE INVENTION

Therefore, with the foregoing in mind, it is an object of the present invention to provide a deflection device capable of enhancing a deflection efficiency, and efficiently correcting pincushion distortion in upper and lower portions while reducing a change in the shape of a beam spot, and a projection tube apparatus provided with the deflection device.

A deflection device for a projection tube of the present invention includes a main deflection device for generating a raster and an auxiliary deflection device for correcting a convergence. The auxiliary deflection device includes an auxiliary horizontal coil, an auxiliary vertical coil, and a ferrite core. In a first deflection device for a projection tube, the auxiliary horizontal coil is a toroidal coil, and the auxiliary vertical coil is a saddle-type coil. In a second deflection device for a projection tube, the auxiliary horizontal coil is a saddle-type coil, and the auxiliary vertical coil is a toroidal coil.

The projection tube apparatus of the present invention includes the above-mentioned first or second deflection device for a projection tube of the present invention.

These and other advantages of the present invention will become apparent to those skilled in the art upon reading and understanding the following detailed description with reference to the accompanying figures.

BRIEF DESCRIPTION OF THE DRAWINGS

FIG. 6A is a front view of another conventional auxiliary deflection device, and FIG. 6B is a side view thereof.

DESCRIPTION OF THE PREFERRED EMBODIMENTS

Figure 1:
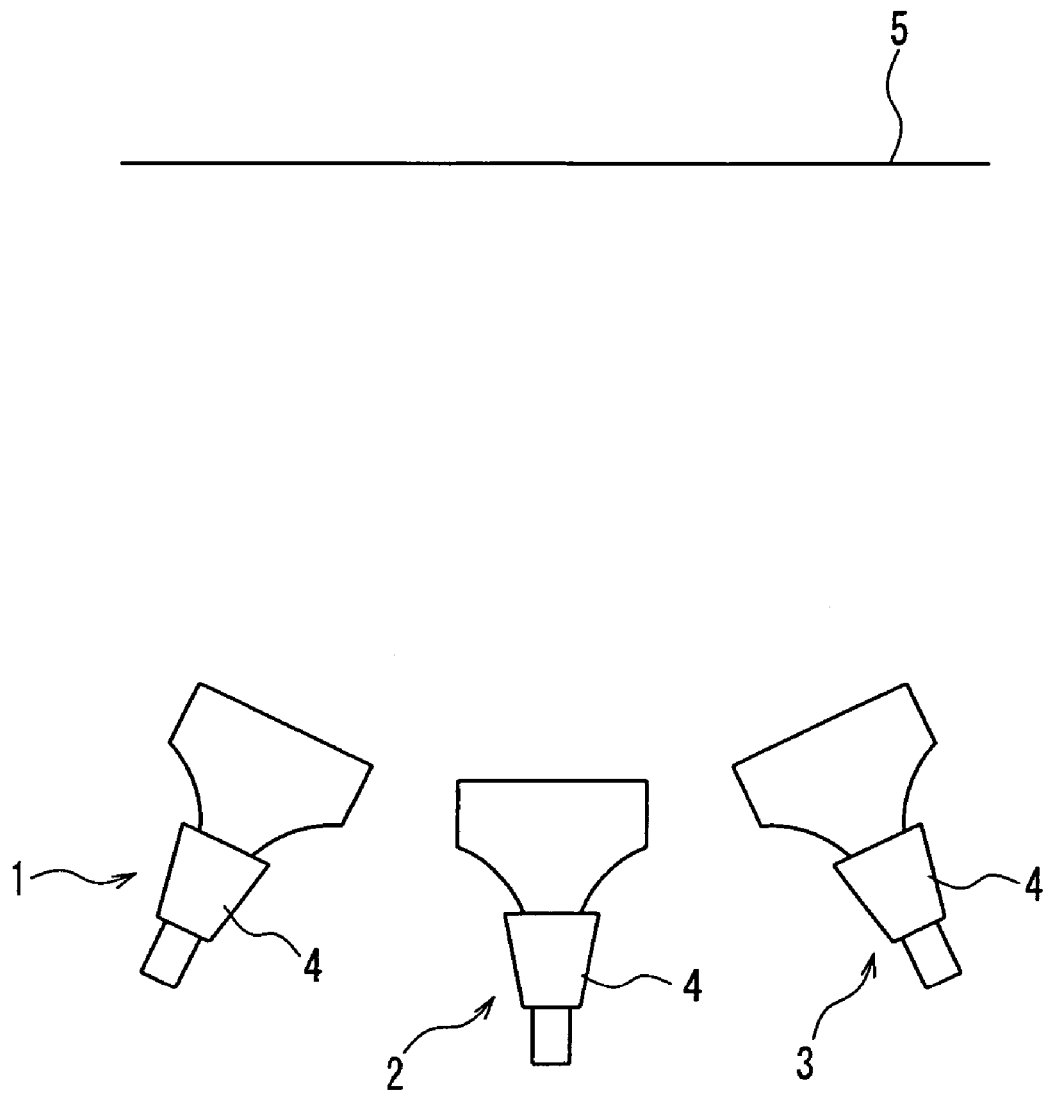
FIG. 1 is a schematic view showing a configuration of a conventional projection TV.
Figure 2:
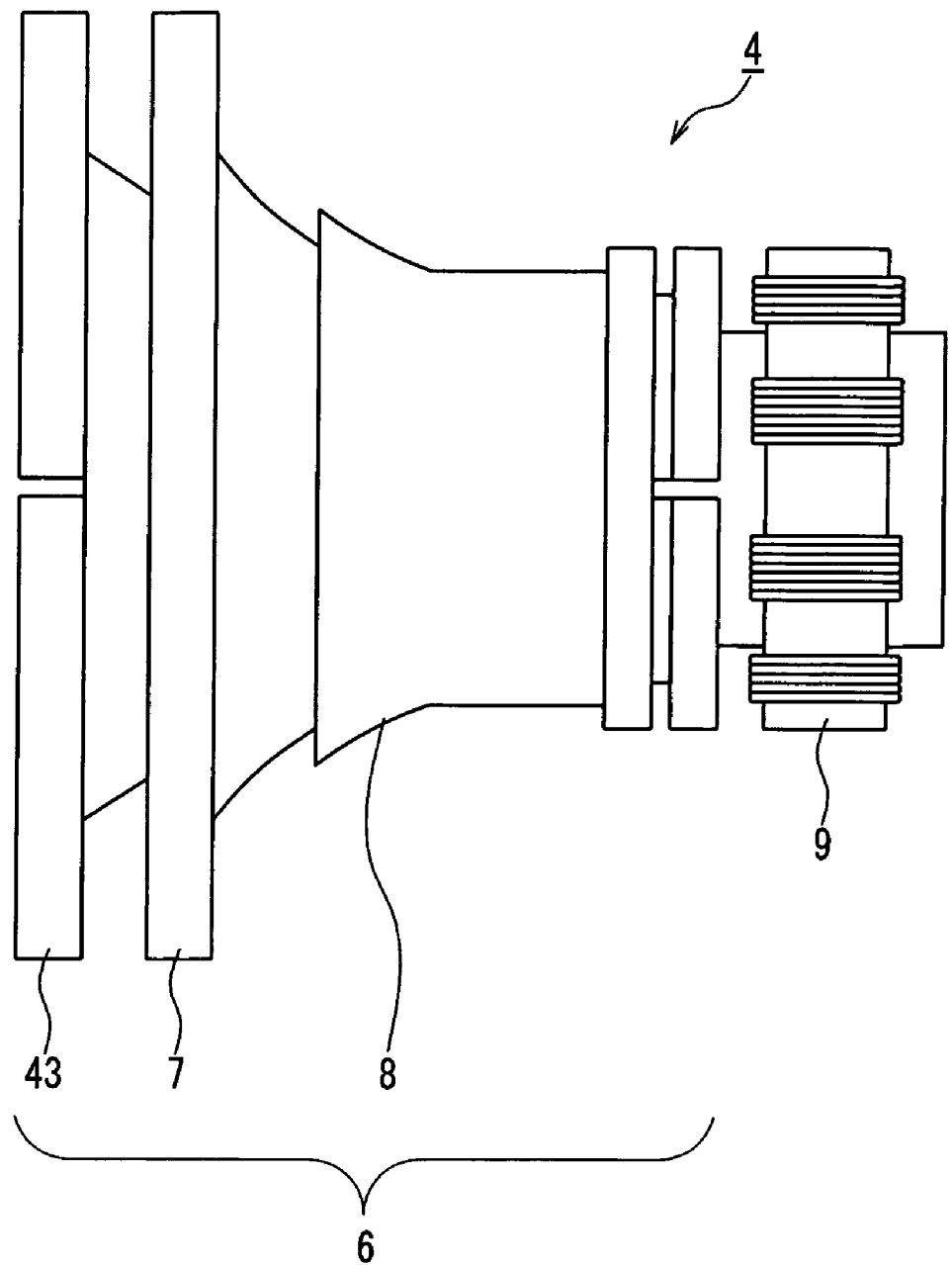
FIG. 2 is a side view of a deflection device used in the conventional projection TV.
Figure 3:
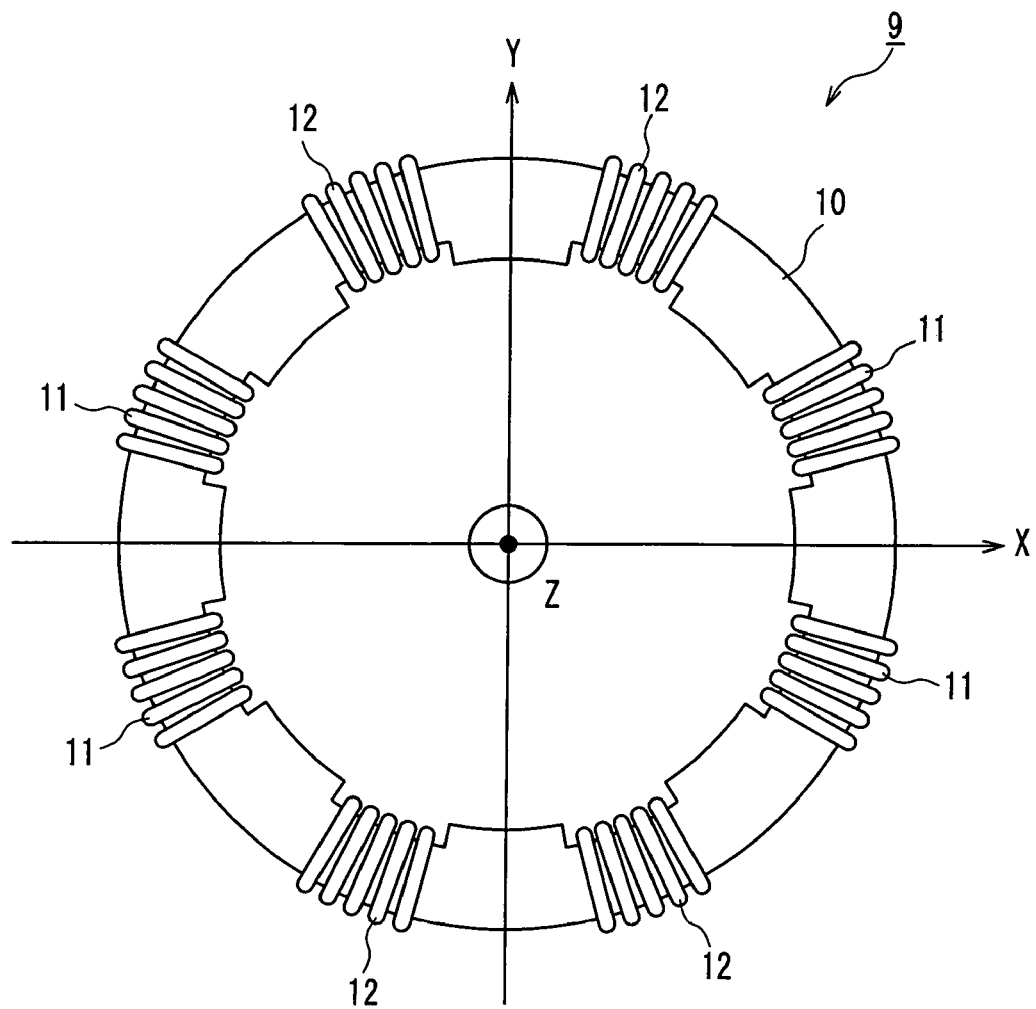
FIG. 3 is a front view of a conventional auxiliary deflection device.
Figure 4A:
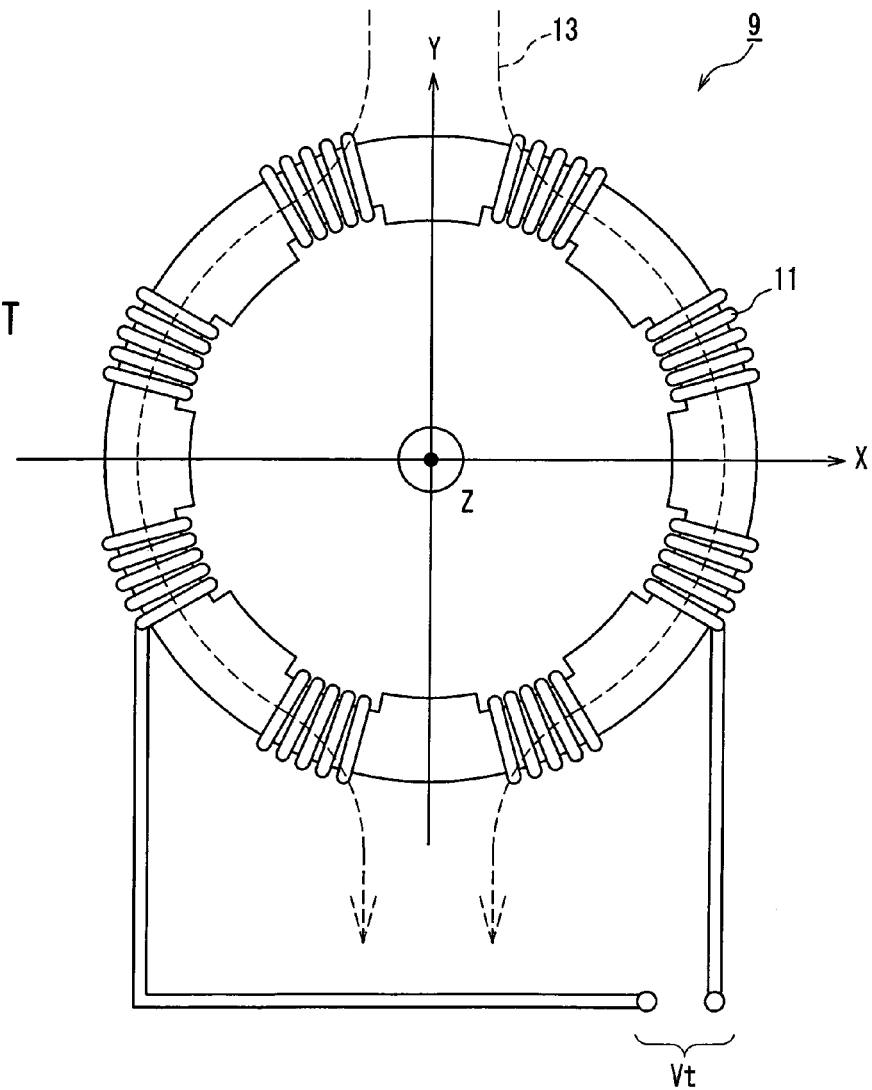
FIG. 4A is a schematic view showing a state in which a main horizontal magnetic field acts on the conventional auxiliary deflection device.
Figure 4B:
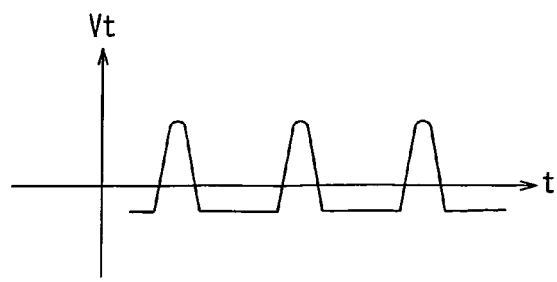
FIG. 4B is a diagram showing a voltage waveform generated between terminals of an auxiliary horizontal coil due to a main horizontal magnetic field.
Figure 5:
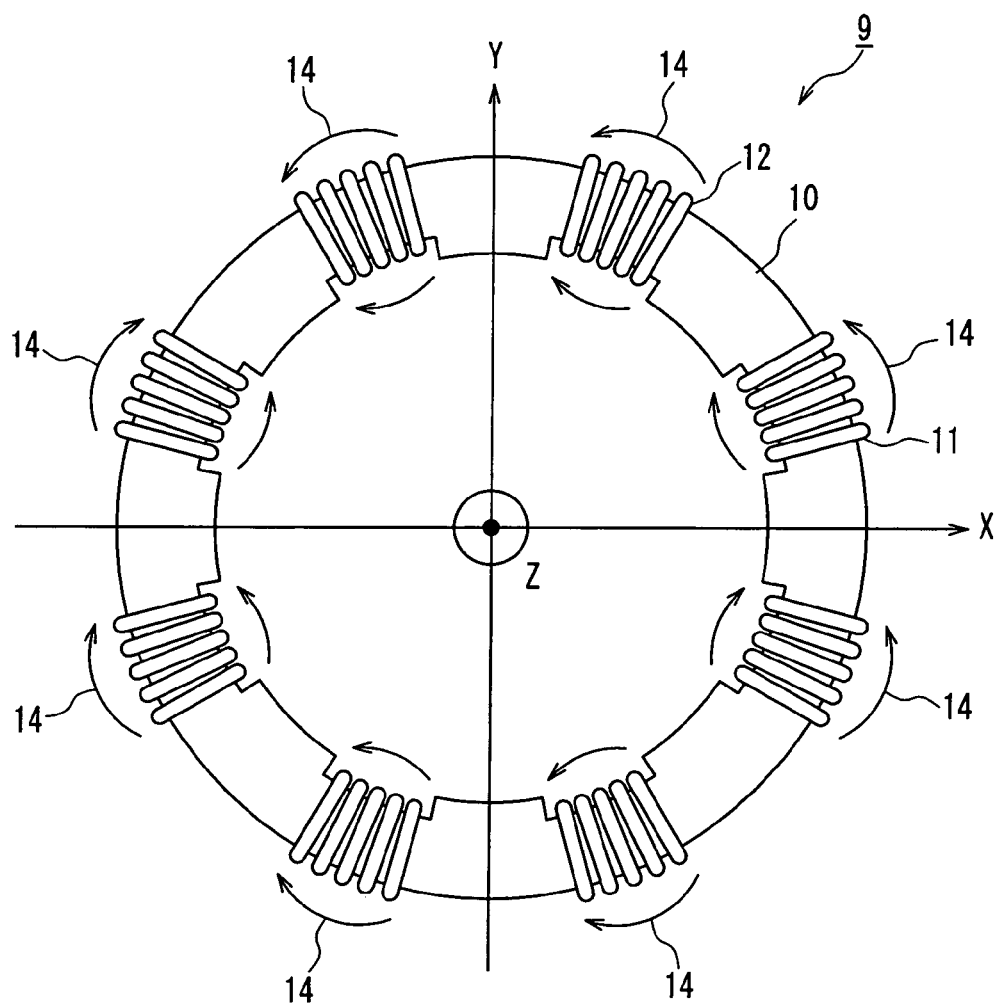
FIG. 5 is a diagram showing a magnetic field during an operation of the conventional auxiliary deflection device.
Figure 7:
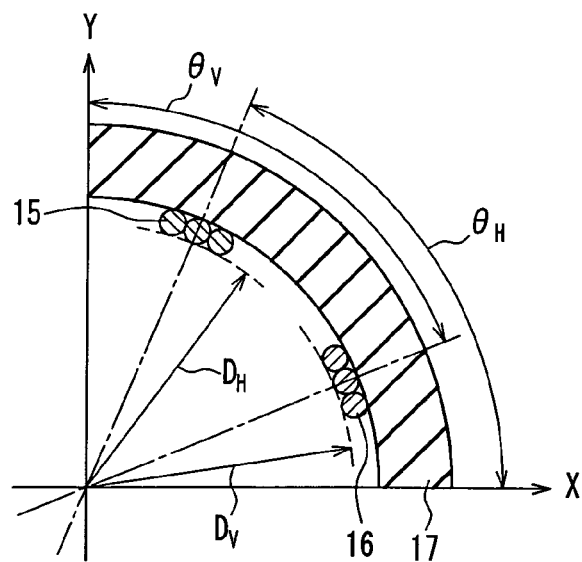
FIG. 7 is a cross-sectional view taken along a line VII—VII in FIG. 6B.
Figure 8:
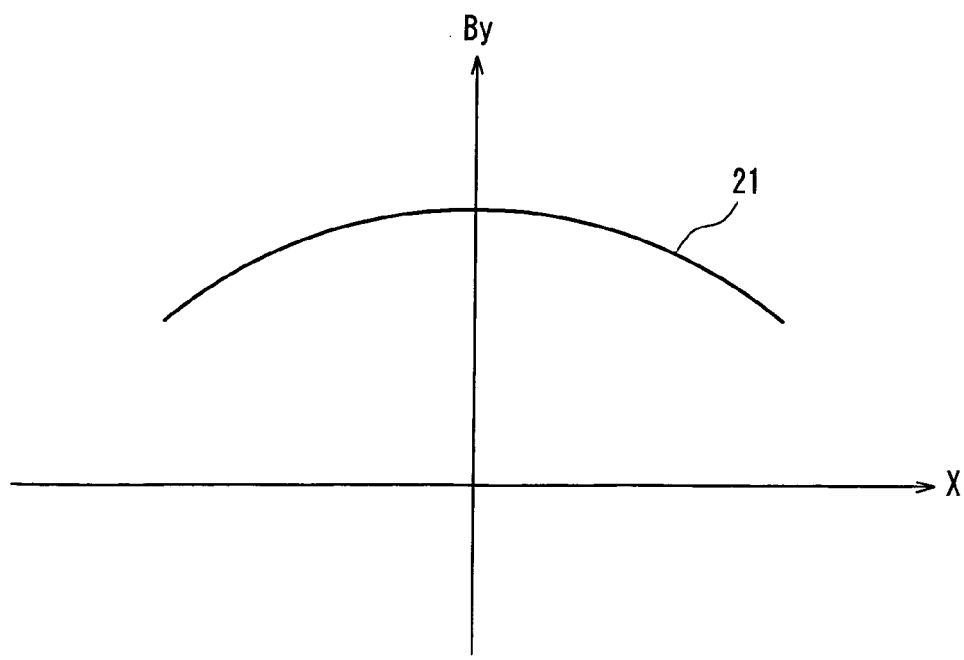
FIG. 8 is a graph showing results obtained by measuring a Y-axis direction component By of an auxiliary horizontal magnetic field generated by a saddle-type auxiliary horizontal coil along an X-axis.
Figure 9:
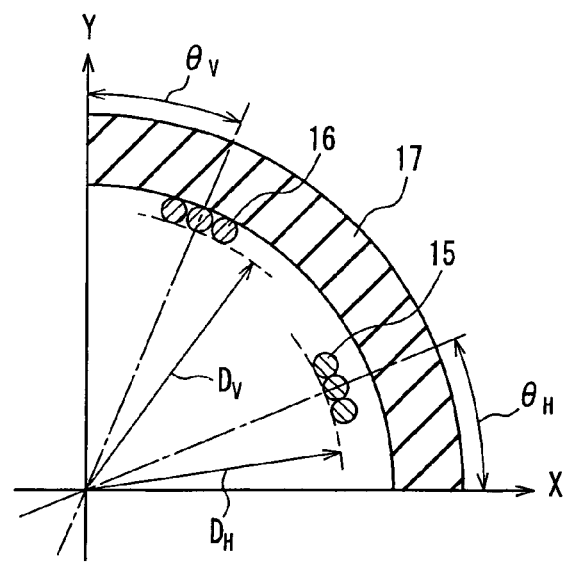
FIG. 9 is a cross-sectional view showing a modified example of the conventional auxiliary deflection device.
Figure 10:
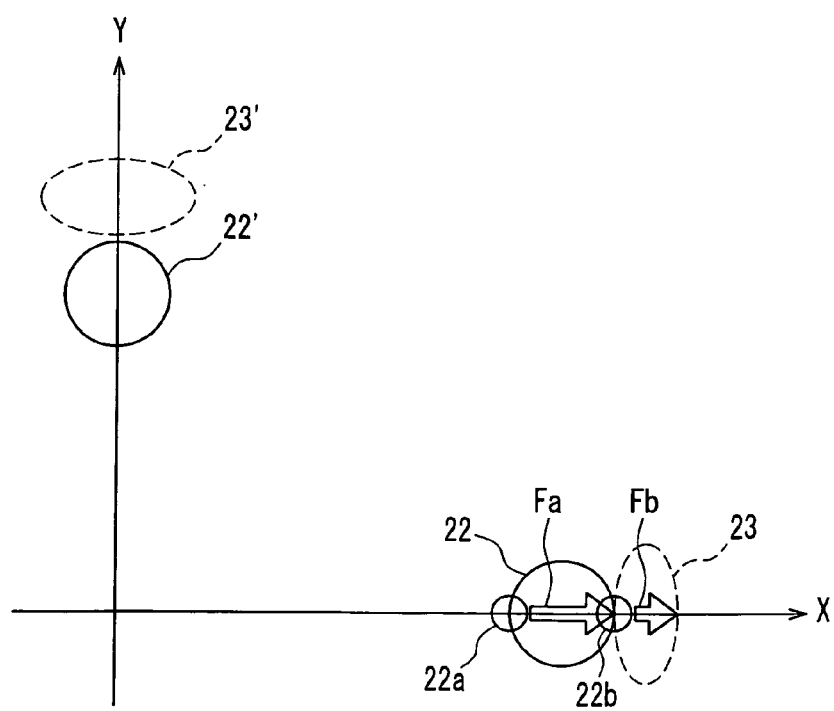
FIG. 10 is a schematic view showing an influence of a barrel-type auxiliary horizontal magnetic field and a barrel-type auxiliary vertical magnetic field on the shape of a beam spot in the conventional deflection device.

According to the deflection device for a projection tube of the present invention, one of the auxiliary horizontal coil and the auxiliary vertical coil is a toroidal coil, and the other thereof is a saddle-type coil. Therefore, compared with the conventional example, the deflection efficiency can be enhanced, and pincushion distortion in upper and lower portions can be corrected efficiently while a change in the shape of a beam spot during an operation of the auxiliary deflection device is reduced.

Furthermore, the projection tube apparatus of the present invention has the deflection device for a projection tube of the present invention, so that a projection tube apparatus with low power consumption and less variation in image quality can be provided.

According to the present invention, an XYZ rectangular coordinate system is defined, in which a tube axis of the projection tube apparatus to be provided with the main deflection device is a Z-axis, a horizontal axis orthogonal to the Z-axis is an X-axis, and a vertical axis orthogonal to the X-axis and the Z-axis is a Y-axis.

In the first deflection device for a projection tube of the present invention, it is preferable that, in an XY plane including the X-axis and the Y-axis, the auxiliary horizontal coil is placed on a straight line passing through the Z-axis and forming an angle of 30° with respect to the X-axis or in the vicinity thereof, and a deflection contributing portion of the auxiliary vertical coil parallel to the Z-axis is placed on a straight line passing through the Z-axis and forming an angle of 30° with respect to the Y-axis or in the vicinity thereof. In the second deflection device for a projection tube of the present invention, it is preferable that, in an XY plane including the X-axis and the Y-axis, a deflection contributing portion of the auxiliary horizontal coil parallel to the Z-axis is placed on a straight line passing through the Z-axis and forming an angle of 30° with respect to the X-axis or in the vicinity thereof, and the auxiliary vertical coil is placed on a straight line passing through the Z-axis and forming an angle of 300 with respect to the Y-axis or in the vicinity thereof. According to these preferable configurations, the distortion of the shape of a beam spot during an operation of the auxiliary deflection device can be reduced further. In the present invention, the above-mentioned "vicinity of a straight line forming an angle of 30°" refers to preferably a range of 30°+7.5°, and more preferably a range of 30°±5°.

In the first deflection device for a projection tube of the present invention, it is preferable that a cross-over portion of the auxiliary vertical coil substantially parallel to an XY-plane protrudes in the Z-axis direction with respect to the ferrite core, and the cross-over portion and the deflection contributing portion of the auxiliary vertical coil parallel to the Z-axis are placed on a common virtual cylindrical surface with respect to the Z-axis. According to this preferable configuration, the inductance of the auxiliary vertical coil can be reduced without decreasing the winding number of the auxiliary vertical coil. Furthermore, in the second deflection device for a projection tube of the present invention, it is preferable that a cross-over portion of the auxiliary horizontal coil substantially parallel to an XY-plane protrudes in the Z-axis direction with respect to the ferrite core, and the cross-over portion and the deflection contributing portion of the auxiliary horizontal coil parallel to the Z-axis are placed on a common virtual cylindrical surface with respect to the Z-axis. According to this preferable configuration, the inductance of the auxiliary horizontal coil can be reduced without decreasing the winding number of the auxiliary horizontal coil. Thus, in any of the configurations, the power consumption of the projection tube apparatus can be reduced further.

In the first deflection device for a projection tube of the present invention, it is preferable that a protruding portion is formed on an inner circumferential surface of the ferrite core, and an inner diameter of the ferrite core at a top part of the protruding portion is smaller than an outer diameter of the auxiliary vertical coil. According to this preferable configuration, the effective inner diameter of the auxiliary horizontal coil can be decreased. Furthermore, in the second deflection device for a projection tube of the present invention, it is preferable that a protruding portion is formed on an inner circumferential surface of the ferrite core, and an inner diameter of the ferrite core at a top part of the protruding portion is smaller than an outer diameter of the auxiliary horizontal coil. According to this preferable configuration, the effective inner diameter of the auxiliary vertical coil can be decreased. Thus, in any of the configurations, the deflection efficiency can be enhanced further.

In the first deflection device for a projection tube of the present invention, it is preferable that the auxiliary horizontal coil includes a plurality of toroidal windings placed at a plurality of parts symmetrical with respect to an XZ-plane including the X-axis and the Z-axis and a YZ-plane including the Y-axis and the Z-axis, and the auxiliary vertical coil includes a pair of saddle-type windings placed on both sides with respect to the YZ-plane. In this case, it is preferable that, on an inner circumferential surface of the ferrite core, a protruding portion is formed in a region excluding the parts where the plurality of toroidal windings are placed and parts where two pairs of deflection contributing portions parallel to the Z-axis among the pair of saddle-type windings are placed. Furthermore, assuming that an inner diameter of the ferrite core in a concave part for an auxiliary horizontal coil in which the toroidal winding is placed is $D_{H1}$, an inner diameter of the ferrite core in a concave part for an auxiliary vertical coil in which the deflection contributing portion is placed is $D_{V1}$, and an inner diameter of the ferrite core at a top part of the protruding portion is $D_P$, it is preferable that a relationship: $D_{H1} > D_{V1} > D_P$ is satisfied. Furthermore, assuming that, on one side with respect to the XZ-plane, an angle formed by two straight lines passing through the Z-axis and each end on the Y-axis side of a pair of the concave parts for an auxiliary horizontal coil present on both sides with respect to the YZ-plane is $\theta_S$, a unit of the inner diameter $D_P$ is mm, and a unit of the angle $\theta_S$ is °, it is preferable that a relationship: $2.6 < \theta_S/D_P < 3.35$ is satisfied. In such a preferable configuration, the deflection efficiency of the auxiliary horizontal coil is enhanced, and the power consumption can be reduced.

Furthermore, in the second deflection device for a projection tube of the present invention, it is preferable that the auxiliary vertical coil includes a plurality of toroidal windings placed at a plurality of parts symmetrical with respect to an XZ-plane including the X-axis and the Z-axis and a YZ-plane including the Y-axis and the Z-axis, and the auxiliary horizontal coil includes a pair of saddle-type windings placed on both sides with respect to the XZ-plane. In this case, it is preferable that, on an inner circumferential surface of the ferrite core, a protruding portion is formed in a region excluding the parts where the plurality of toroidal windings are placed and parts where two pairs of deflection contributing portions parallel to the Z-axis among the pair of saddle-type windings are placed. Furthermore, assuming that an inner diameter of the ferrite core in a concave part for an auxiliary vertical coil in which the toroidal winding is placed is $D_{V1}$, an inner diameter of the ferrite core in a concave part for an auxiliary horizontal coil in which the deflection contributing portion is placed is $D_{H1}$, and an inner diameter of the ferrite core at a top part of the protruding portion is $D_P$, it is preferable that a relationship: $D_{V1} > D_{H1} > D_P$ is satisfied. Furthermore, assuming that, on one side with respect to the YZ-plane, an angle formed by two straight lines passing through the Z-axis and each end on the X-axis side of a pair of the concave parts for an auxiliary vertical coil present on both sides with respect to the XZ-plane is $\theta_S$, a unit of the inner diameter $D_P$ is mm, and a unit of the angle $\theta_S$ is °, it is preferable that a relationship: $2.6 < \theta_S/D_P < 3.35$ is satisfied. In such a preferable configuration, the deflection efficiency of the auxiliary vertical coil is enhanced, and the power consumption can be reduced.

Hereinafter, the present invention will be described by way of illustrative embodiments with reference to the drawings.

Embodiment 1

Figure 11:
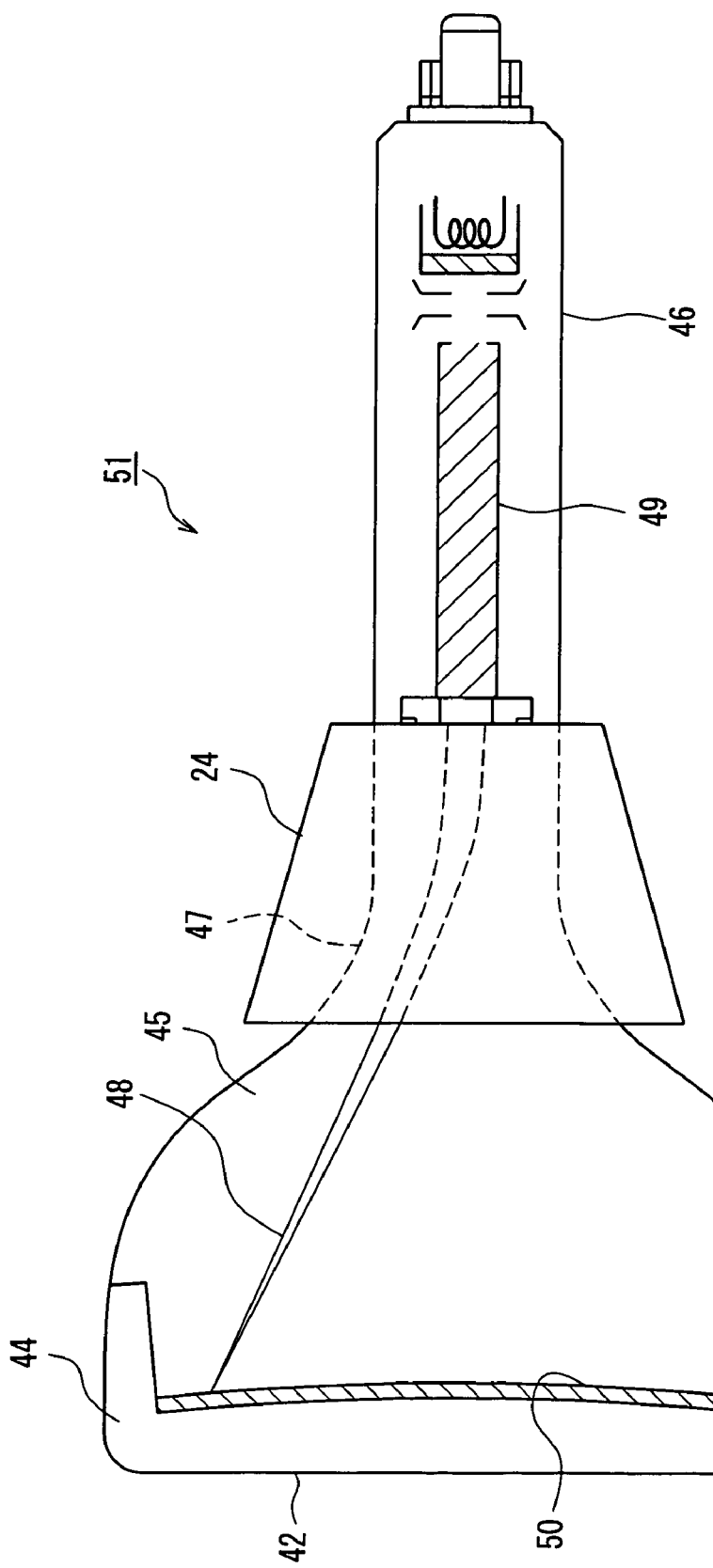
FIG. 11 is a side view of a projection tube apparatus according to one embodiment of the present invention.

First, one embodiment of the projection tube apparatus of the present invention will be described with reference to FIG. 11. As shown in FIG. 11, a projection tube apparatus 51 of the present embodiment includes a vacuum envelope composed of a glass panel 44 with a substantially rectangular screen display portion 42, a glass funnel 45 in a funnel shape connected to the panel 44, and a neck portion 46 made of glass in a cylindrical shape connected to the funnel 45. On an outer circumferential surface of the envelope extending from the neck portion 46 to the funnel 45, a deflection device 24 is mounted. The funnel 45 has a small-diameter portion (so-called yoke portion 47) extending from a connected position with respect to the neck portion 46 through a region where the deflection device 24 is mounted. In the neck portion 46, an electron gun 49 for emitting an electron beam 48 is provided. The electron beam 48 is deflected in horizontal and vertical directions by horizontal and vertical deflection magnetic fields generated by the deflection device 24, and scans a screen 50 in horizontal and vertical directions, whereby an image is displayed on the screen 50.

Figure 12:
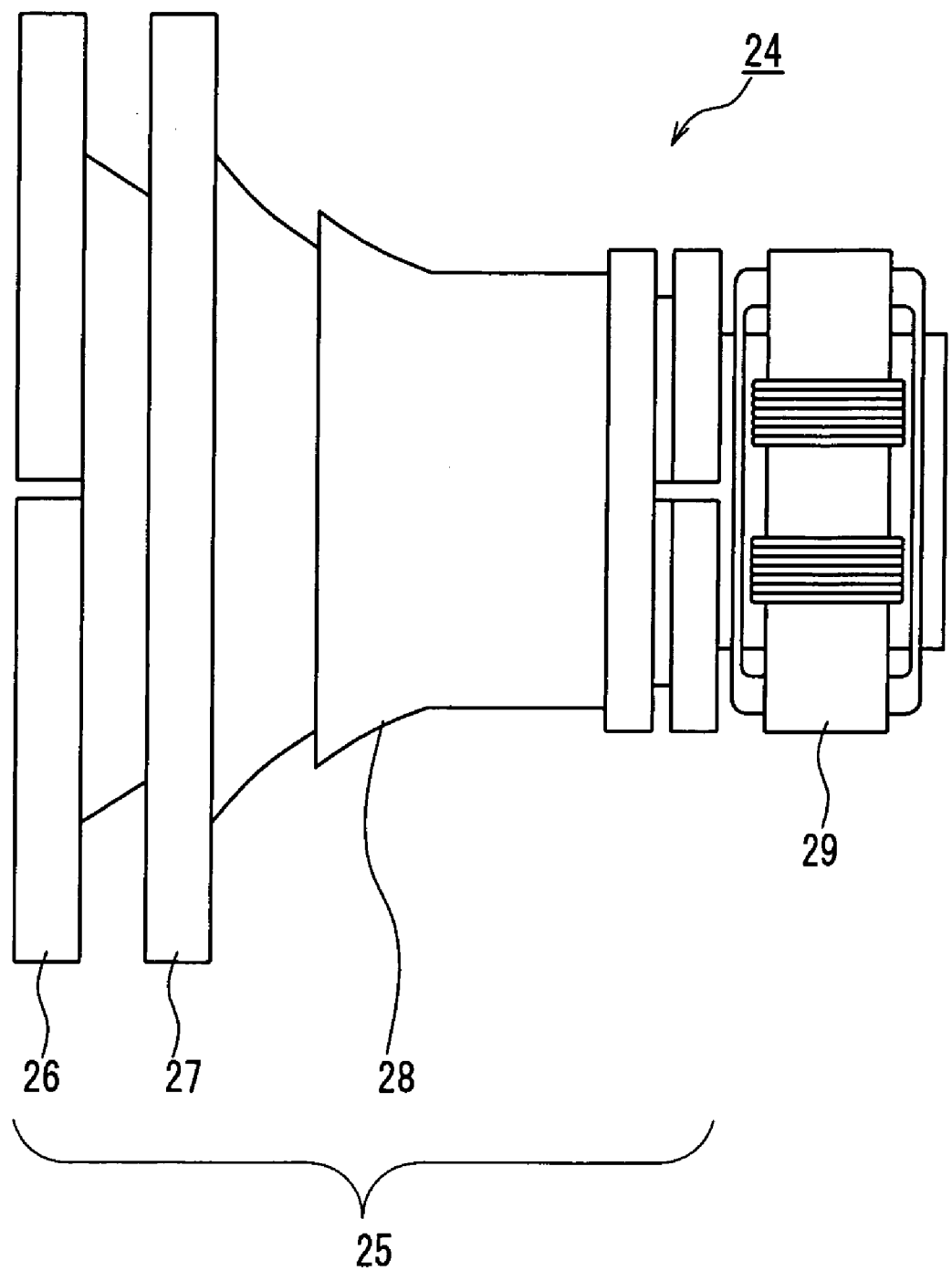
FIG. 12 is a side view of a deflection device according to one embodiment of the present invention.

FIG. 12 is a side view of the deflection device 24 according to one embodiment of the present invention. The deflection device 24 is composed of a main deflection device 25 in which a main horizontal coil 26, a main vertical coil 27, and a main core 28 are placed successively from the tube axis toward the outside, and an auxiliary deflection device 29 provided on a neck side of the main deflection device 25.

Figure 13:
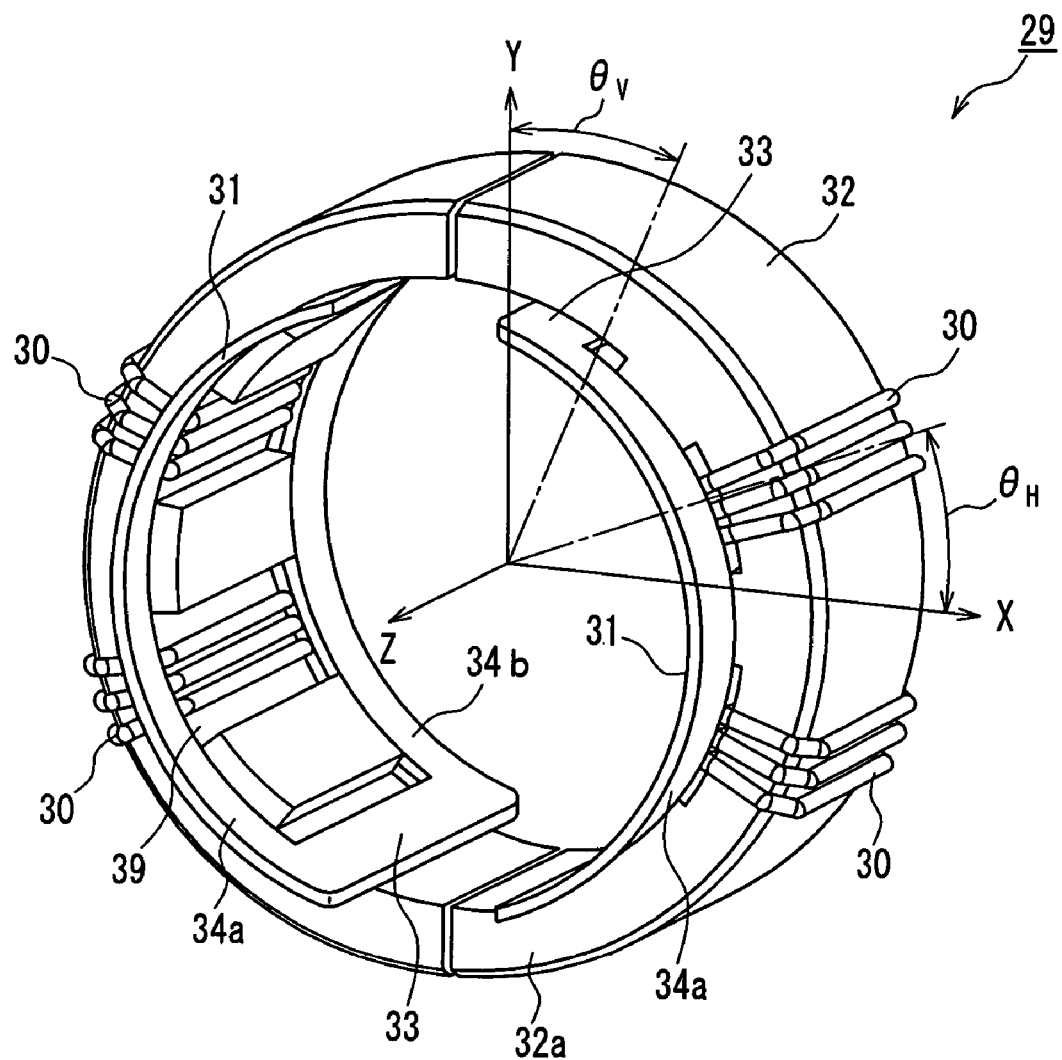
FIG. 13 is a perspective view of an auxiliary deflection device according to one embodiment in the deflection device of the present invention.

FIG. 13 is a perspective view of the auxiliary deflection device 29. The auxiliary deflection device 29 is composed of an auxiliary horizontal coil 30, an auxiliary vertical coil 31, and an auxiliary core 32. A winding of the auxiliary horizontal coil 30 is wound around the auxiliary core 32 in a toroidal shape, and a winding of the auxiliary vertical coil 31 is wound in a saddle shape. Although the auxiliary vertical coil 31 is shown in a simplified form as a thin plate shape in FIG. 13, the auxiliary vertical coil 31 is actually a saddle-type coil of about 20 turns.

The toroidal auxiliary horizontal coil 30 is wound at four parts so as to be symmetrical with respect to the XZ-plane and the YZ-plane. In the XY-plane, a winding angle $\theta_H$ of the auxiliary horizontal coil 30, defined by an angle formed by the X-axis and a straight line passing through the Z-axis and a midpoint in a region where each auxiliary horizontal coil 30 is present in a circumferential direction with respect to the Z-axis, is about 30°.

The saddle-type auxiliary vertical coil 31 is placed in a pair so as to be symmetrical with respect to the YZ-plane, on the Z-axis side with respect to the auxiliary core 32, and on both sides with respect to the YZ-plane. The auxiliary vertical coil 31 includes a pair of deflection contributing portions 33 with a winding being substantially parallel to the Z-axis, and cross-over portions 34a, 34b with a winding being parallel to the XY-plane, placed in an arc shape with respect to the Z-axis. In the XY-plane, a winding angle $\theta_V$ of the auxiliary vertical coil 31, defined by an angle formed by the Y-axis and a straight line passing through the Z-axis and a midpoint in a region where the deflection contributing portion 33 is present in a circumferential direction with respect to the Z-axis, is about 30°.

With the above-mentioned configuration, the power consumption of the auxiliary deflection device can be reduced. This will be described with reference to FIGS. 13 and 14.

According to the present invention, the auxiliary vertical coil 31 is set to be a saddle type. Therefore, as shown in FIG. 13, there is an opening 39 where a winding is not present, surrounded by the pair of deflection contributing portions 33 substantially parallel to the Z-axis, and the cross-over portion 34a on a panel side and the cross-over portion 34b on a neck side, which do not contribute to the deflection.

Figure 14:
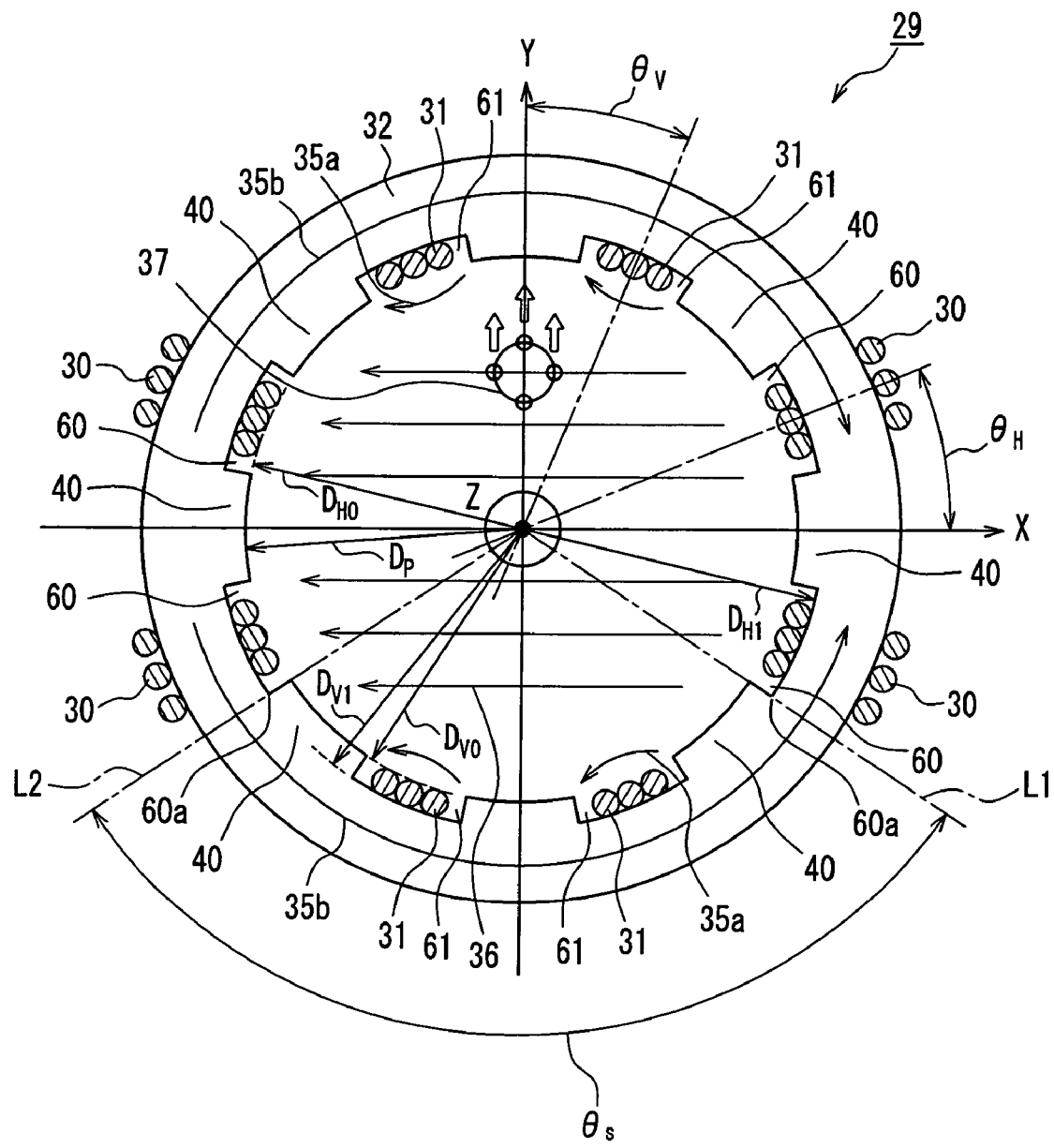
FIG. 14 is a cross-sectional view of the auxiliary deflection device according to one embodiment in the deflection device of the present invention.

FIG. 14 is a cross-sectional view in a plane parallel to the XY-plane of the auxiliary deflection device 29. As shown in FIG. 14, the auxiliary horizontal coil 30 is inserted in the opening 39. Furthermore, on an inner circumferential surface of the auxiliary core 32, regions not opposed to the deflection contributing portions 33 of the auxiliary vertical coil 31 and the auxiliary horizontal coil 30 protrude toward the Z-axis, whereby auxiliary core protruding portions 40 are formed. The auxiliary core protruding portions 40 also are inserted in the opening 39. Assuming that the inner and outer diameters of the deflection contributing portions 33 of the auxiliary vertical coil 31 are $D_{V0}$, $D_{V1}$, respectively, the inner diameter of the auxiliary horizontal coil 30 is $D_{H0}$, and the inner diameter of the auxiliary core 32 at a top part of the auxiliary core protruding portion 40 is $D_P$, $D_{V0}$, $D_{H0}$ and $D_P$ are substantially equal to each other. Thus, $D_P < D_{V1}$ and $D_{H0} < D_{V1}$. This enables the deflection contributing portions 33 of the auxiliary vertical coil 31 and the auxiliary horizontal coil 30 to be as close as possible to an electron beam. Therefore, the deflection efficiency of the auxiliary vertical coil 31 and the auxiliary horizontal coil 30 can be enhanced. Furthermore, the auxiliary core 32 is allowed to be as close as possible to an electron beam by providing the auxiliary core protruding portions 40 on the inner circumferential surface of the auxiliary core 32 to such a degree that the auxiliary core protruding portions 40 do not interfere with the auxiliary vertical coil 31 and the auxiliary horizontal coil 30, so that the deflection efficiency of the auxiliary vertical coil 31 and the auxiliary horizontal coil 30 are enhanced further. Furthermore, the auxiliary vertical coil 31 is set to be a saddle type, and placed on the Z-axis side with respect to the auxiliary core 32. Therefore, an auxiliary deflection magnetic field of the auxiliary vertical coil 31 does not leak outside beyond the auxiliary core 32. Thus, the total power consumption of the auxiliary deflection device 29 can be reduced.

According to the auxiliary deflection device 29, the power consumption of the auxiliary horizontal coil 30 can be reduced. This will be described below.

On the inner circumferential surface of the auxiliary core 32, assuming that an inner diameter of the auxiliary core 32 in a concave part 60 for an auxiliary horizontal coil in which the toroidal winding of the auxiliary horizontal coil 30 is placed is $D_{H1}$, and an inner diameter (which is matched with the above-mentioned outer diameter $D_{V1}$ of the deflection contributing portion 33) of the auxiliary core 32 in a concave part 61 for an auxiliary vertical coil in which the deflection contributing portion 33 of the auxiliary vertical coil 31 is placed is $D_{V1}$, these diameters and the inner diameter $D_P$ of the auxiliary core 32 at a top part of the auxiliary core protruding portion 40 satisfy a relationship: $D_{H1} > D_{V1} > D_P$. More specifically, a bottom surface of the concave part 61 for an auxiliary vertical coil closer to the Y-axis than the concave part 60 for an auxiliary horizontal coil and the top part of the auxiliary core protruding portion 40 are placed closer to the Z-axis, compared with a bottom surface of the concave part 60 for an auxiliary horizontal coil. Therefore, as a whole, the inner circumferential surface of the auxiliary core 32 is close to an electron beam at the Y-axis and in the vicinity thereof, so that the action of the auxiliary horizontal deflection magnetic field substantially along the Y-axis is intensified. Consequently, the deflection efficiency of the auxiliary horizontal coil 30 is enhanced, which can reduce the power consumption.

Furthermore, on one side with respect to the XZ-plane, an angle $\theta_S$ is defined, which is formed by two straight lines L1, L2 passing through the Z-axis and each end 60a on the Y-axis side of a pair of the concave parts 60 for an auxiliary horizontal coil present on both sides with respect to the YZ-plane. Herein, the angle $\theta_S$ refers to an angle formed in a region including the Y-axis by the two crossing straight lines L1, L2. Assuming that a unit of the angle θs is °, and a unit of the inner diameter $D_P$ of the auxiliary core 32 at a top part of the auxiliary core protruding portion 40 is mm, they satisfy a relationship: $2.6 < \theta_S/D_P < 3.35$. When $\theta_S/D_P > 3.35$, i.e., $\theta_S$ is relatively large, and the power consumption of the auxiliary horizontal coil 30 is reduced; however, in a circumferential direction with respect to the Z-axis, a region where the auxiliary horizontal coil 30 can be placed becomes narrow. This makes it difficult to include the desired number of turns in the winding of the auxiliary horizontal coil 30. When $\theta_S/D_P \leq 2.6$, i.e., $\theta_S$ is relatively small, and in a circumferential direction with respect to the Z-axis, a region where the auxiliary horizontal deflection magnetic field substantially along the Y-axis is emitted from the inner circumferential surface of the auxiliary core 32 to the space on the Z-axis side becomes narrow. This weakens the effect of enhancing the action of the auxiliary horizontal deflection magnetic field, and decreases the effect of reducing the power consumption. That is, in the case where the ratio $\theta_S/D_P$ satisfies the above-mentioned numerical range, the deflection efficiency of the auxiliary horizontal coil 30 can be enhanced, and the power consumption can be reduced.

Furthermore, according to the auxiliary deflection device 29, a change in the shape of a beam spot during an operation can be reduced. The reason for this will be described with reference to FIG. 14. When an auxiliary deflection current is allowed to flow through the auxiliary vertical coil 31 in which the winding angle $\theta_V$ with respect to the Y-axis is set to be about 30°, a magnetic field is generated in the periphery of the auxiliary vertical coil 31. This magnetic field is composed of a magnetic field 35a passing through the space on the Z-axis side with respect to the auxiliary core 32 and a magnetic field 35b passing through an inside of the auxiliary core 32. The magnetic field 35b passing through the inside of the auxiliary core 32 is emitted toward the space on the Z-axis side with respect to the auxiliary core 33 at a position away from the auxiliary vertical coil 31. The magnetic field 35a generated in the vicinity of the auxiliary vertical coil 31 is combined with the magnetic field emitted from the auxiliary core 32, whereby an auxiliary vertical deflection magnetic field 36 is formed in the space on the Z-axis side with respect to the auxiliary core 32. The magnetic field 36 is substantially parallel to the X-axis, and the intensity distribution thereof in the Y-axis direction is substantially uniform. Consequently, the Lorentz force applied to electrons constituting an electron beam 37 from the magnetic field 36 is the same irrespective of the position of the electrons in the XY cross-section. Thus, irrespective of the operation of the auxiliary vertical coil 31, the spot shape of the electronic beam 37 is substantially circular at all times. The auxiliary vertical coil 31 has been described above. Regarding the auxiliary horizontal coil 30, the winding angle $\theta_H$ with respect to the X-axis is set to be about 30°, so that the spot shape of the electron beam 37 also is substantially circular at all times, irrespective of the operation of the auxiliary horizontal coil 30. Thus, according to the auxiliary deflection device 29, the shape of a beam spot hardly changes irrespective of the degree of the operation.

Figure 15:
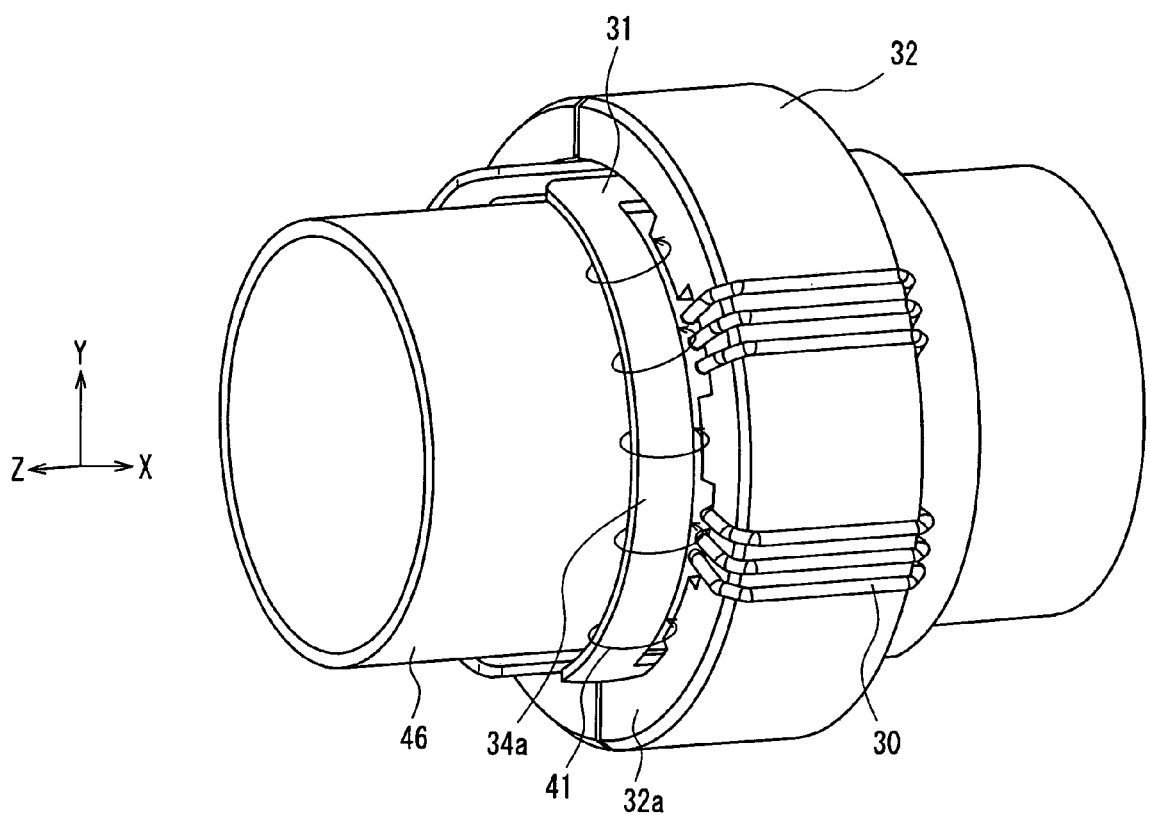
FIG. 15 is a perspective view showing a cross-over portion of an auxiliary vertical coil of the auxiliary deflection device and a magnetic field generated therefrom according to one embodiment of the present invention.

Next, the relationship between the shapes of the cross-over portions 34a, 34b of the auxiliary vertical coil 31 and the power consumption in a projection TV set will be described with reference to FIGS. 13 and 15. As shown in FIG. 13, the cross-over portions 34a, 34b of the auxiliary vertical coil 31 protrude in the Z-axis direction with respect to an end face 32a of the auxiliary core 32, and the cross-over portions 34a, 34b and the deflection contributing portions 33 are placed substantially on a common virtual cylindrical surface with respect to the Z-axis. The cross-over portions 34a, 34b also can be bent so as to be away from the Z-axis, in addition to the arrangement shown in FIG. 13. In this case, the cross-over portions 34a, 34b approach the end face 32a of the auxiliary core 32 along the end face 32a. However, the arrangement as shown in FIG. 13 is preferable because the power consumption in a projection TV set can be reduced. The reason for this is as follows.

In the case where the cross-over portions 34a, 34b are allowed to protrude in the Z-axis direction with respect to the end face 32a as shown in FIG. 13, the cross-over portions 34a, 34b can be set to be away from the auxiliary core 32, compared with the case where the cross-over portions 34a, 34b are bent along the end face 32a. Thus, as shown in FIG. 15, the number of magnetic fluxes absorbed by the auxiliary core 32 in a magnetic field 41 generated from the cross-over portions 34a, 34b decreases, and the number of magnetic fluxes that are interlinked with the auxiliary vertical coil 31 decreases. Thus, the inductance value of the auxiliary vertical coil 31 can be reduced. Since the winding number of the auxiliary vertical coil 31 does not change even if the cross-over portions 34a, 34b are allowed to protrude in the Z-axis direction with respect to the end face 32a, the magnetomotive force with respect to an electron beam does not change. The frequency of an auxiliary deflection current applied to the auxiliary deflection device 29 is very high (i.e., hundreds of KHz), and the power consumption depends upon the inductance more than the D.C. resistance of a coil. An inductance value can be decreased without changing the magnetomotive force with respect to an electron beam by arranging the cross-over portions 34a, 34b as shown in FIGS. 13 and 15, so that $LI^2$, which is an index of the power consumption of a TV set, can be decreased efficiently.

The auxiliary core protruding portion 40 formed on the inner circumferential surface of the auxiliary core 32, seen along the Z-axis, shown in the above-mentioned embodiment, is set to be a rectangular (trapezoidal) shape. However, the present invention is not limited thereto, and the shape of the auxiliary core protruding portion 40 may be a semisphere. Furthermore, the auxiliary core protruding portion 40 may not be formed. In the case where the auxiliary core protruding portion 40 is not formed, although the effect of reducing the power consumption is degraded compared with the case where the auxiliary core protruding portion 40 is formed, the auxiliary core 32 has a simple cylindrical shape, so that the cost thereof can be reduced.

The inventors of the present invention conducted an experiment by producing a projection tube apparatus with a diagonal size of 7 inches, in which both the winding angle $\theta_H$ of the toroidal auxiliary horizontal coil 30 and the winding angle $\theta_V$ of the saddle-type auxiliary vertical coil 31 are set to be about 30°, and the minimum inner diameter $D_P$ of the auxiliary core 32 is set to be 31 mm in the configuration of the above-mentioned embodiment. Consequently, the inventors have confirmed that the power consumption can be reduced by about 25% compared with the conventional example with almost no influencing of the shape of a beam spot. Furthermore, when the angle $\theta_S$ shown in FIG. 14 was set to be 103°, $LI^2$ that is an index of the power consumption regarding the auxiliary horizontal coil 30 was reduced by 20.5% compared with the conventional example.

In the above embodiment, the auxiliary horizontal coil 30 is set to be a toroidal type, and the auxiliary vertical coil 31 is set to be a saddle type. However, for example, in the case of giving a higher priority to the reduction in an induced voltage caused by a main horizontal magnetic field than to the enhancement of a deflection efficiency of the auxiliary vertical coil, in accordance with the demand from a projection TV set manufacturer, the auxiliary horizontal coil may be set to be a saddle type, and the auxiliary vertical coil may be set to be a toroidal type. The configuration and effect in this case can be understood easily by reading the above description, keeping in mind that the auxiliary horizontal coil is set to be a saddle type, and the auxiliary vertical coil is set to be a toroidal type. Therefore, the detailed description thereof will be omitted here. In this case, although the effect of enhancing the deflection efficiency of the auxiliary vertical coil is decreased, an induced voltage induced to the auxiliary horizontal coil can be reduced.

The applicable field of the present invention is not particularly limited. For example, present invention can be used in an image projection portion of a projection TV.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A deflection device for a projection tube, comprising a main deflection device for generating a raster and an auxiliary deflection device for correcting a convergence,
wherein the auxiliary deflection device includes an auxiliary horizontal coil, an auxiliary vertical coil, and a ferrite core on which the auxiliary horizontal coil and the auxiliary vertical coil are wound,
the auxiliary horizontal coil is a toroidal coil, and the auxiliary vertical coil is a saddle-type coil, and
the ferrite core is provided separately from a main core of the main deflection device.

2. The deflection device for a projection tube according to claim 1, wherein, assuming that an XYZ rectangular coordinate system is defined in which a tube axis of a projection tube apparatus to be provided with the main deflection device is a Z-axis, an axis in a horizontal direction orthogonal to the Z-axis is an X-axis, and an axis in a vertical direction orthogonal to the X-axis and the Z-axis is a Y-axis, in an XY plane including the X-axis and the Y-axis, the auxiliary horizontal coil is placed on a straight line passing through the Z-axis and forming an angle of 30° with respect to the X-axis or in the vicinity thereof, and a deflection contributing portion of the auxiliary vertical coil parallel to the Z-axis is placed on a straight line passing through the Z-axis and forming an angle of 30° with respect to the Y-axis or in the vicinity thereof.

3. The deflection device for a projection tube according to claim 1, wherein, assuming that an XYZ rectangular coordinate system is defined in which a tube axis of a projection tube apparatus to be provided with the main deflection device is a Z-axis, an axis in a horizontal direction orthogonal to the Z-axis is an X-axis, and an axis in a vertical direction orthogonal to the X-axis and the Z-axis is a Y-axis, a cross-over portion of the auxiliary vertical coil substantially parallel to an XY-plane protrudes in the Z-axis direction with respect to the ferrite core, and the cross-over portion and a deflection contributing portion of the auxiliary vertical coil parallel to the Z-axis are placed on a common virtual cylindrical surface with respect to the Z-axis.

4. The deflection device for a projection tube according to claim 1, wherein a protruding portion is formed on an inner circumferential surface of the ferrite core, and an inner diameter of the ferrite core at a top part of the protruding portion is smaller than an outer diameter of the auxiliary vertical coil.

5. The deflection device for a projection tube according to claim 1, wherein, assuming that an XYZ rectangular coordinate system is defined in which a tube axis of a projection tube apparatus to be provided with the main deflection device is a Z-axis, an axis in a horizontal direction orthogonal to the Z-axis is an X-axis, and an axis in a vertical direction orthogonal to the X-axis and the Z-axis is a Y-axis,
the auxiliary horizontal coil includes a plurality of toroidal windings placed at a plurality of parts symmetrical with respect to an XZ-plane including the X-axis and the Z-axis and a YZ-plane including the Y-axis and the Z-axis,
the auxiliary vertical coil includes a pair of saddle-type windings placed on both sides with respect to the YZ-plane,
on an inner circumferential surface of the ferrite core, a protruding portion is formed in a region excluding the parts where the plurality of toroidal windings are placed and parts where two pairs of deflection contributing portions parallel to the taxis among the pair of saddle-type windings are placed, assuming that an inner diameter of the ferrite core in a concave part for an auxiliary horizontal coil in which the toroidal winding is placed is $D_{H1}$, an inner diameter of the ferrite core in a concave part for an auxiliary vertical coil in which the deflection contributing portion is placed is $D_{V1}$, and an inner diameter of the ferrite core at atop part of the protruding portion is $D_P$, a relationship: $D_{H1} > D_{V1} > D_P$ is satisfied, and assuming that, on one side with respect to the XZ-plane, an angle formed by two straight lines passing through the Z-axis and each end on the Y-axis side of a pair of the concave parts for an auxiliary horizontal coil present on both sides with respect to the YZ-plane is $\theta_S$, a unit of the inner diameter $D_P$ is mm, and a unit of the angle $\theta_S$ is °, a relationship: $2.6 < \theta_S/D_P < 3.35$ is satisfied.

6. A projection tube apparatus provided with the deflection device for a projection tube of claim 1.

7. A projection display device comprising a plurality of the projection tube apparatus of claim 6, and a screen, the plurality of projection tube apparatus projecting rasters of respective colors onto the screen.

* * * * *